No. 881,280.  
PATENTED MAR. 10, 1908.

J. P. ANDERSEN & E. G. DEAN.  
POST HOLE DIGGER.  
APPLICATION FILED JULY 12, 1907.

2 SHEETS—SHEET 1.

WITNESSES:

INVENTORS  
John P. Andersen  
Edward G. Dean

ATTORNEYS

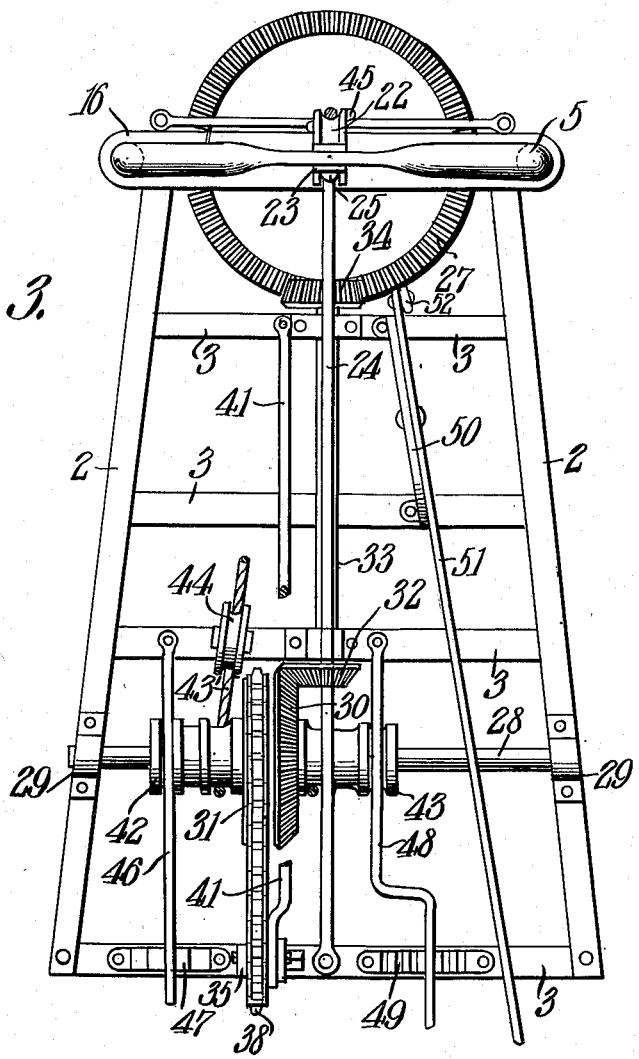

UNITED STATES PATENT OFFICE.

JOHN P. ANDERSEN AND EDWARD G. DEAN, OF NAPER, NEBRASKA.

POST-HOLE DIGGER.

No. 881,280.    Specification of Letters Patent.    Patented March 10, 1908.

Application filed July 12, 1907. Serial No. 383,491.

*To all whom it may concern:*

Be it known that we, JOHN P. ANDERSEN and EDWARD G. DEAN, citizens of the United States, residing at Naper, in the county of Boyd, State of Nebraska, have invented a new and useful Post-Hole Digger, of which the following is a specification.

This invention has reference to improvements in post-hole diggers, and is designed to produce a machine for the purpose which may be carried upon an ordinary wagon body, and which will expeditiously produce the post-holes, either when operated by hand or, when so desired, by power.
The invention consists essentially in a suitable earth-auger provided with means for rotating the same through the intermediary of suitable transmission gear arranged to act upon the auger to rotate it while the said auger bores its way into the ground, while provision is made for lifting the auger out of the ground after the hole has been bored, and for bringing pressure to bear upon said auger to force it into earth which is too hard for the auger to force itself into when simply rotated. Furthermore, provision is made for diverting the earth which is carried upward by the auger to such a distance from the mouth of the post-hole as to be prevented from gravitating therein.

The invention will be fully understood from the following detailed description, taken in connection with the accompanying drawings forming part of this specification, in which,—

Figure 1:
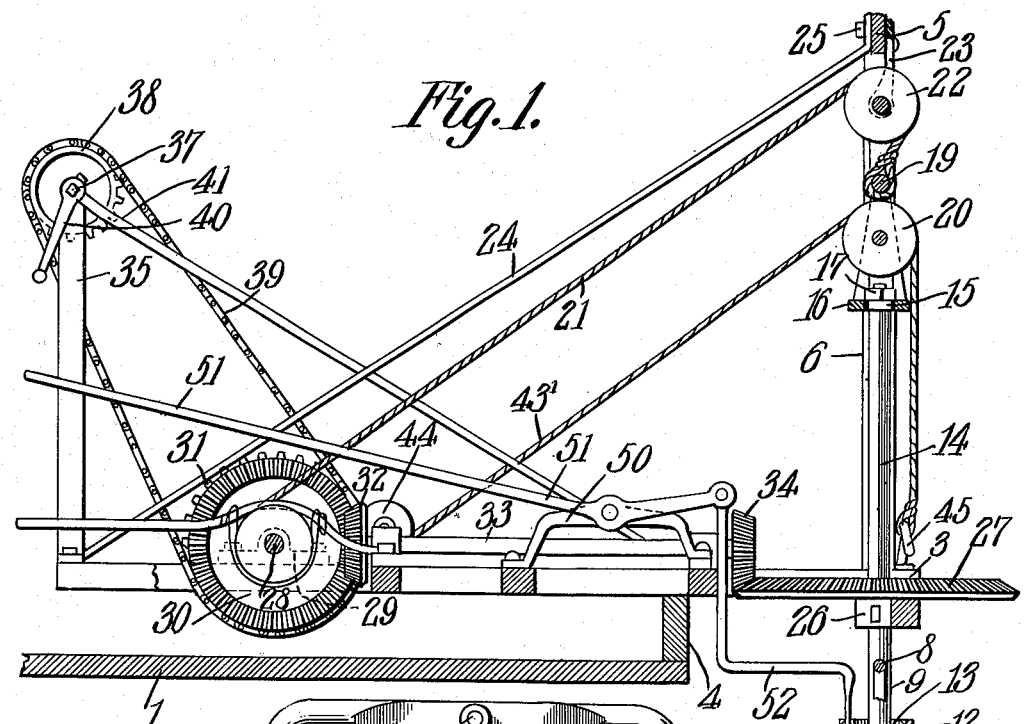
Figure 2:
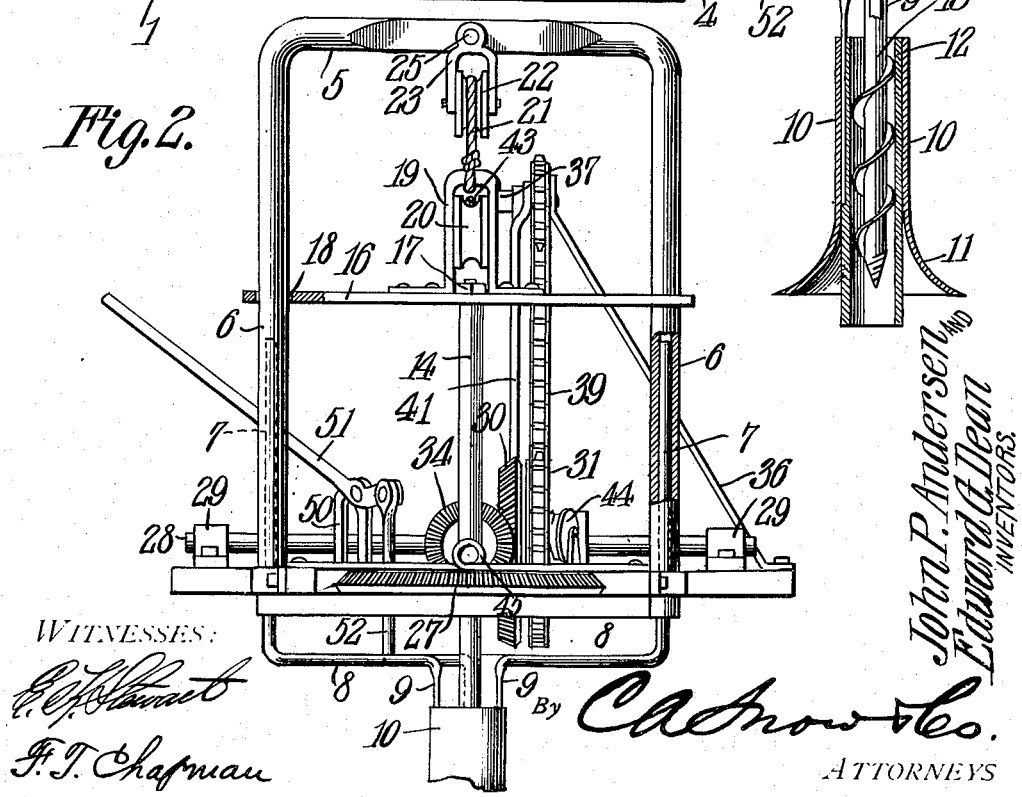

Figure 1 is a central longitudinal section through the machine, with parts shown in elevation; Fig. 2 is a front elevation thereof, with parts shown in section; and Fig. 3 is a plan view, with some parts omitted.

Referring to the drawings, there is shown a frame 1 which may be taken as indicative of a wagon body. Upon the wagon body is secured in any suitable manner a frame composed of side beams 2 and cross beams 3, secured to each other and to the wagon body. The side beams 2 extend rearward beyond the tailgate 4 of the wagon body, and erected upon this rearward extension is an inverted U-shaped frame 5, the side uprights 6 of which are made hollow, as indicated in Fig. 2, to receive bars 7 the lower ends 8 of which are bent toward each other and bent again, before they meet, at right angles, as shown at 9, where they are joined to and carry a hollow dirt deflector 10 having its lower end 11 flaring or bell-shaped, as indicated in Fig. 1.

Fast on the interior of the deflector 10 and concentric therewith is a tubular guide 12 through which extends an earth-auger 13, the stem 14 of which may be made square or of other suitable shape and at the upper end is rounded, as shown at 15, and there passes through a plate 16 to which it is made fast by a nut 17 so that the auger stem and plate will travel together in the direction of the axis of the auger but at the same time the auger is free to rotate upon its axis in said plate. The ends of the plate 16 are perforated, as shown at 18, and through these perforations the legs 6 of the frame 5 extend. The plate is therefore free to move up and down on the frame 5 but cannot turn with relation thereto.

Fast on top of the plate 16 is a yoke 19 in which is journaled a pulley 20, and secured to the upper end of this yoke is a rope or cable 21 passing over a pulley 22 journaled in a pendent frame 23 carried by the cross-arm of the frame 5. In order that the frame 5 may be suitably braced, there is provided a brace rod 24 which may be fastened to the yoke portion of the frame 5 by the same bolt 25 which carries the frame 23, while the other end of this rod may be secured to the cross beam 3 connecting the remote ends of the side beams 2. Supported in suitable journal bearings 26 fast on the cross beam at the rear end of the side beams 2 is a beveled gear wheel 27 through the center of which is passed the stem 14 of the auger 13, and the passage trough this gear wheel is shaped in conformity with the shape of the stem 14, so that the earth-auger is constrained to turn with the gear wheel 27 but still is free to move longitudinally therethrough.

Near the other end of the frame from the earth-auger end is a shaft 28 journaled in boxes 29 on the side beams 2, and this shaft carries a bevel gear 30 and a sprocket wheel 31, either directly secured together or both secured to the shaft to turn therewith. The gear wheel 30 meshes with a bevel pinion 32 fast on one end of a shaft 33 extending longitudinally with relation to the frame 2—3, and at the other end this shaft carries a bevel pinion 34 meshing with the gear wheel 27 before referred to.

Erected on the end of the frame remote from the auger is an upright 35 held rigid by a brace rod 36, and between the upper ends of the upright and brace rod there is journaled a shaft 37 carrying a sprocket pinion 38. The sprocket wheel 31 and the sprocket pinion 38 are joined by a sprocket chain 39, and to the shaft 37 is secured an operating crank 40. Since, however, the operation of the machine is not dependent upon the type of power, it will be understood that either hand-power or any other suitable power may be used, and in the following description it will be assumed that the shaft 37 is driven by the crank 40 through the application of suitable hand-power. The upright 35 may be further strengthened by a brace rod 41 fast at its lower end to one of the cross beams 3.

Mounted upon the shaft 28 are two drums 42 and 43, one being adjacent to one face of the sprocket wheel 31 and the other being adjacent to the opposite face of the gear wheel 30. The drum 42 has secured to it one end of a rope or cable 43' passing under a pulley 44 and ultimately passing around the pulley 20, and its other end is fast to an eye 45 secured to the cross beam 3 at the auger end of the side bars 2. The drum 43 receives the rope or cable 21 which, as before described, passes over the pulley 22 and has its end fast to the yoke 19.

The drum 42 is controlled by a shifting lever 46, one end of which is pivoted to one of the cross beams 3 of the frame and the other end of which engages in a rack block 47. The other drum 43 is under the control of a shifting lever 48, one end of which is pivoted to the same cross beam 3 that carries the lever 46, and the free end of this lever 48 is in operative relation to another rack block 49.

Pivotally supported upon a bracket 50 mounted upon two of the cross beams 3 is a lever 51, the shorter end of which is connected by a bent link 52 to the deflector 10 and the tube 12 therein. Now, let it be assumed that the vehicle upon which the structure is mounted has been so located as to bring the deflector 10 with its tube 12 above the spot in the ground where it is desired to dig a post-hole. When this spot is reached the lever 51 is moved so as to bring the bell end 11 of the deflector 10 close to the ground with the tube 12 resting upon the ground. Now, by manipulating the handle 40 rotative movement is imparted to the sprocket wheel 31 through the sprocket chain 39, and the bevel gear 30 transmits this motion through the pinion 32 to the shaft 33, and thence by the pinion 34 power is transmitted to the gear 27 which rotates in a horizontal plane. In the meantime the drum 43 may be moved out of contact with the bevel gear 30 and the earth-auger is permitted to drop to the ground, and, being rotated by the rotation of the bevel gear 27, will begin to bore its way into the ground, while the loosened earth will be carried upward through the tube 12 until it reaches the upper end thereof and ultimately falls from said upper end and down the sides of the deflector 10, being diverted to a considerable distance away from the mouth of the hole being dug by the flaring sides of the bell 11. This process of digging the hole will continue until the desired depth is reached, which depth is only limited by the length of the stem 14 and the extent of travel of the plate 15.

When the hole has reached the depth desired the drum 43 is brought into frictional contact with the bevel gear 30 by means of the lever 48 and although the rotative movement of the auger continues the drum 43 will cause the winding up of the rope or cable 21 and the auger will be lifted out of the hole already bored until its drilling end is housed within the tube 12. After this has occurred the structure may be moved to the point where the next hole is to be dug and the process repeated. Should, however, during the progress of the boring of a hole, a more compact or less easily penetrated layer of earth be encountered, the drum 42 may be brought into operative relation with the corresponding face of the sprocket wheel 31 and the cable 43' be caused to wind thereon. The tendency of this is to pull down upon the plate 15 through the pulley 20 and tend to force the auger into the earth, thus causing it to penetrate even through earth which it would not penetrate by its own weight.

When the structure is moved from point to point the lever 51 is manipulated to lift the tube 12 with the auger still housed therein off the ground, so as to be free from the ground while the structure is being transported.

While the device has been described as applicable for the digging of post-holes, it will be understood that it is equally applicable for the digging of holes for telephone and telegraph poles, or for any other purpose where it may be used.

We claim:—

1. In a post-hole digger, a suitable supporting frame, hollow uprights at one end thereof, an auger, an auger guide below the uprights, rods fast to the auger guide and entering the hollow uprights, and means for moving said guide in a vertical plane.

2. In a post-hole digger, an earth-auger, a guide through which the auger is movable, and an earth-deflector exterior to the guide, said deflector being spaced at its lower end from said guide to receive the earth elevated by the auger and to divert it from the bore produced by said auger.

3. In a post-hole digger, an earth-auger, a guide therefor, a deflector exterior to the guide and flaring at its lower end for receiving the dirt elevated by the auger and for diverting the same away from the post-hole, and means for elevating and depressing said guide and deflector.

4. In a post-hole digger, an earth auger, means for rotating the same comprising a gear train receiving power at one end and engaging the auger at the other end, a rope or cable having a connection at one end to a fixed portion of the machine, a pulley acting on the auger and over which the rope or cable passes, a drum receiving the other end of said rope or cable, and means for moving the drum into frictional engagement with the driving gear for bringing pressure to bear upon the auger to drive it into the earth.

5. In a post-hole digger, an earth-auger, means for rotating the same comprising a gear train receiving power at one end and engaging the auger at the other end, a rope or cable having a connection at one end to a fixed portion of the machine, a pulley acting on the auger and over which the rope or cable passes, a drum receiving the other end of said rope or cable, means for moving the drum into frictional engagement with the driving gear for bringing pressure to bear upon the auger to drive it into the earth, another rope or cable connected to the auger, another drum receiving said second rope or cable, and means for moving the second drum into frictional engagement with the driving means for lifting the auger out of the ground.

6. A post-hole digger comprising a suitable frame, an earth-auger, another frame having hollow standards, a support for the earth-auger movable on said last-named frame, a tubular auger guide, supports for the latter movable into said hollow standards, a dirt-deflector exterior to the auger guide, means for elevating and depressing the auger guide and dirt deflector, driving means for the auger, means for elevating said auger, and means for bringing pressure to bear upon the auger to drive it into the ground.

In testimony that we claim the foregoing as our own, we have hereto affixed our signatures in the presence of two witnesses.

JOHN P. ANDERSEN.
EDWARD G. DEAN.

Witnesses:
T. E. SMITH,
HENRY AUBURN.